(12) United States Patent
Galang et al.

(10) Patent No.: US 8,248,745 B2
(45) Date of Patent: Aug. 21, 2012

(54) ELECTRICAL OVER/UNDER VOLTAGE AUTOMATIC DISCONNECT APPARATUS AND METHOD

(75) Inventors: Einstein C. Galang, Daly City, CA (US); Demian Martin, San Leandro, CA (US); Sobswad Pholpoke, Nonthaburi (TH)

(73) Assignee: Monster, LLC, Las Vegas, NV (US)

( * ) Notice: Subject to any disclaimer, the term of this patent is extended or adjusted under 35 U.S.C. 154(b) by 0 days.

(21) Appl. No.: 12/511,748

(22) Filed: Jul. 29, 2009

(65) Prior Publication Data
US 2010/0008004 A1 Jan. 14, 2010

Related U.S. Application Data

(60) Division of application No. 11/750,910, filed on May 18, 2007, now Pat. No. 7,633,732, which is a continuation of application No. 10/251,240, filed on Sep. 20, 2002, now Pat. No. 7,262,945.

(51) Int. Cl.
*H02H 3/00* (2006.01)

(52) U.S. Cl. .......................................... 361/91.1; 361/42

(58) Field of Classification Search .................... 361/42, 361/90, 91.1
See application file for complete search history.

(56) References Cited

U.S. PATENT DOCUMENTS

| 3,878,436 A * | 4/1975 | Bogel ............................. 361/72 |
| 4,068,276 A * | 1/1978 | Pintell ............................ 361/46 |
| 5,568,344 A * | 10/1996 | Gernhardt et al. .............. 361/42 |
| 6,040,969 A * | 3/2000 | Winch et al. .................... 361/82 |
| 6,816,350 B1 * | 11/2004 | Hoopes ........................... 361/90 |
| 7,262,945 B2 * | 8/2007 | Galang et al. ................ 361/91.1 |

* cited by examiner

*Primary Examiner* — Danny Nguyen
(74) *Attorney, Agent, or Firm* — LaRiviere, Grubman & Payne, LLP

(57) ABSTRACT

A method for providing an analog or digital circuit that senses both low and high input voltage and operates to disconnect both line and neutral electrical power connections to a protected device when abnormally low or high voltages are received from a single- or multi-phase power source, and reconnects the protected device when input power has stabilized. The sensing circuit and power supply is functional with voltages up to at least 240 Vac. The nominal 120 Vac circuit is designed to withstand a 6 kilovolt surge without damage. The method does not disconnect the ground line during an out-of-tolerance voltage condition.

5 Claims, 6 Drawing Sheets

ELECTRICAL OVER/UNDER VOLTAGE AUTOMATIC DISCONNECT APPARATUS AND METHOD

RELATED APPLICATION

This is a divisional application from U.S. patent application Ser. No. 11/750,910, filed on May 18, 2007 and entitled "Electrical Over/Under Voltage Automatic Disconnect Apparatus and Method," which in turn was a continuation of U.S. patent application Ser. No. 10/251,240; filed Sep. 20, 2002 and entitled "Electrical Over/Under Voltage Automatic Disconnect Apparatus and Method".

TECHNICAL FIELD

A method to automatically disconnect both hot line (L) and neutral (N) connections, but not the ground (G) connection, to a power center whenever the continuous voltage between any two wires (L-N, L-G, N-G) exceed a pre-determined voltage of alternating current and automatically reconnects the outlet power center when the voltage returns to an acceptable level. The method may use either analog or digital logic and is applicable to single or multiphase power sources up to 250 volts (Vac) or more. The method further senses the supplied voltage and prevents a connection of the load to the power source if the supplied voltage is less than a predetermined level.

BACKGROUND ART

It is common in the electrical art to use surge protective devices in the power supply of electronic equipment See, for example, U.S. Pat. No. 5,978,198 to Packard et al. Metal oxide varistors (MOVs) are frequently used to provide surge protection. MOVs are designed to absorb an enormous amount of power for a very short time, such as occurs during a power line surge condition. However, MOVs can easily be damaged, with serious consequences, if the line voltage exceeds the safe ratings (typically 275 V) for the MOVs for more than a short period, commonly approximately 100 milliseconds (ms). What is needed is a circuit that will detect unsafe voltages or currents and disconnect the power through the MOV system when the voltage exceeds the safe limit and before the MOVs or other components are damaged, and reconnect it when the voltage returns to and stabilizes in a safe range. What is further needed is a circuit that will sense an out-of-tolerance low voltage and disconnect the power through the MOV system when such low voltage conditions exist and automatically reconnect it when the voltage returns to and stabilizes in a safe range.

Another common problem in the electrical art is mis-wiring of the electrical source, such as errors made in connecting the common household electrical outlet. While common household outlets are configured to accept the three wires, L, N, and G, there is no physical barrier in common household electrical outlets that prevents the wires being connected to the wrong terminals. See, for example, U.S. Pat. No. 6,040,969 to Winch et al. for an apparatus to address this problem. What is needed is a surge protection device that can also detect incorrect wiring, in addition to out-of-tolerance voltages, and prevent conduction of electrical power through to a device to be protected.

DISCLOSURE OF INVENTION

The following discussion of the present invention is presented in terms of a single phase, nominal 120 Vac circuit for simplicity of understanding the invention. The present invention is also applicable to multi-phase circuits and voltages up to nominal 240 Vac. Higher voltages may be possible, depending on the availability of components with suitable tolerances. The invention is applicable to surge protection devices and the like used to protect sensitive electronic devices having microcircuit components, such as computers, audio and visual equipment, from dangerous conditions such as out of specification voltages and current surges. The invention includes a circuit that senses both low and high input voltage and activates at least one relay to disconnect both line and neutral electrical power connections to a protected device, before the apparatus suffers electrical damage such as a blown metal oxide varistor or fuse, when abnormally low or high voltages are received from a power source. The sensing circuit and power supply for a nominal 120 Vac single phase circuit is able to withstand a continuous 250 Vrms (volts, root-mean-square) or more for more that 100 milliseconds (ms). The circuit is further designed to withstand a 6 kilovolt (kV) surge without damage. Power surges are also detected and absorbed. The apparatus does not disconnect the ground (G) line during an out-of-tolerance voltage condition. The invention continues to monitor the input power source and automatically reconnects the load when the source has demonstrated acceptable voltages for a set period of time, typically 10 to 20 seconds, and preferably 15 seconds. The analog and digital exemplary embodiments described below provide surge protection meeting the Underwriter's Laboratory 1449 standard, including a 6 kV 8×20 microsecond @ 3000 ampere surge test under L-N, L-G and N-G mis-wiring scenarios, without component damage.

BRIEF DESCRIPTION OF THE DRAWING

The invention will be more fully understood by reference to the following drawing which is for illustrative purposes only and where like reference numbers denote like elements.

MODES FOR CARRYING OUT THE INVENTION

The following discussion of the present invention is presented in terms of a single phase, nominal 120 Vac circuit for simplicity of understanding the invention. The present invention is also applicable to multi-phase circuits and voltages up to nominal 240 Vac. Higher voltages may be possible, depending on the availability of components with suitable tolerances. The present invention is an apparatus containing an electrical analog circuit that provides automatic disconnect protection to any electrical device connected with the apparatus. Both analog and digital control circuits are contemplated by the present invention. The apparatus comprises a cord having a plug 1 for connecting to a source of alternating current (AC) power, such as an ordinary household electrical outlet. Alternatively, the apparatus could be hard wired into another, larger device, such as an equipment rack or another electrical device. The apparatus may contain individual outlets 5 for receiving the plugs of electronic devices to be so protected, or alternatively, the protected devices may be other electronic components hard wired to the apparatus of the present invention.

The following description of the exemplary analog and digital embodiments is in terms of a nominal 120 Vac power source. Alternative embodiments suitable for other power sources or higher voltages, using appropriately-sized components, will be readily apparent to a practitioner skilled in the electrical arts and are herein included by reference.

Figure 1:
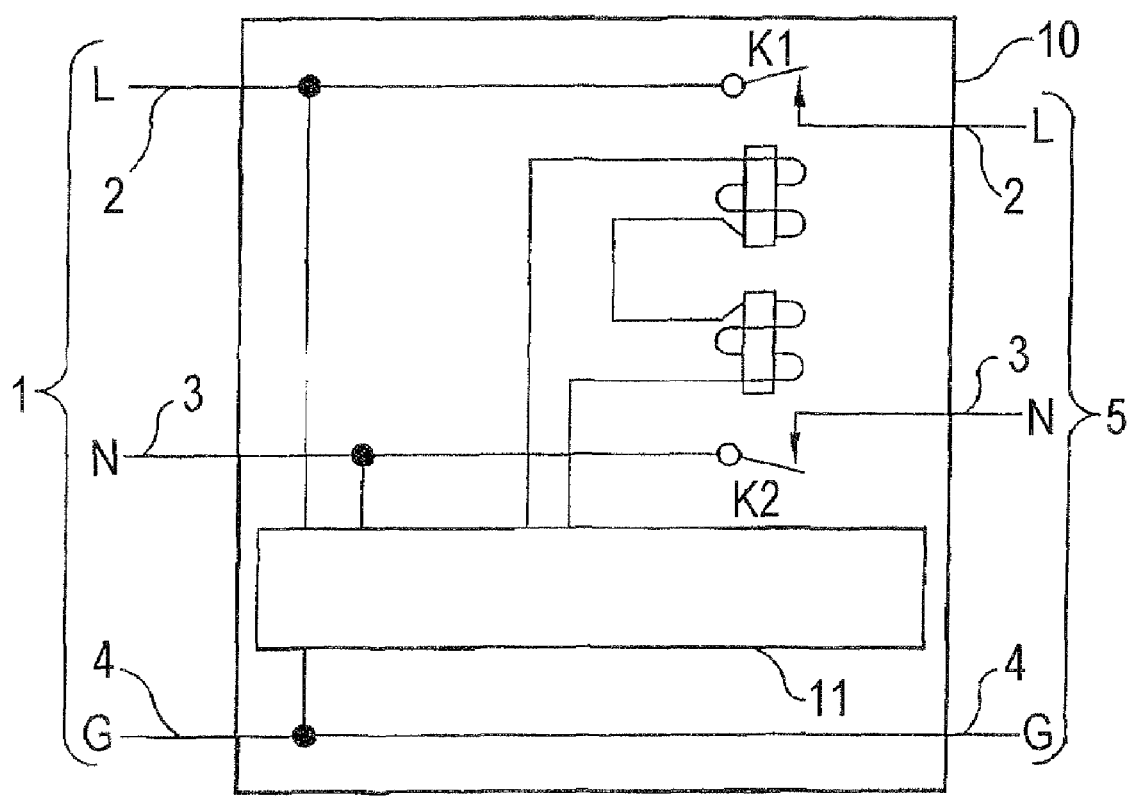
FIG. 1 is a block diagram of an exemplary means to accomplish the method according to the present invention.

Referring to FIG. 1, a block diagram of an exemplary embodiment of the present invention is shown. Electrical over/under voltage disconnect apparatus 100 is a disconnect circuit unit 10 having power input connector 1 and power output connector 5. Connector 1 is a three-wire connection having line 2, neutral 3 and ground 4 components. Connector 1 may be either a three-wire cable having a three-prong plug for plugging into an ordinary ac power outlet of approximately either 120 Vrms or 250 Vrms, or may alternatively be wire connections made directly to the line, neutral and ground of the power source (hard-wired). Output connector 5 may be either a three-prong receptacle suitable for receiving a plug from an electrical device to be protected, or may alternatively be hard wired as line 2, neutral 3 and ground 4 directly to an electrical device to be protected. Output connector 5 may also be a multiple outlet device for receiving the power plugs of more than one device, i.e., a multitap device.

Unit 10 is an electrical circuit having relays K1 and K2 for disconnecting line 2 and neutral 3 respectively when commanded to do so by Voltage Sensors and Control Circuit (VSCC) 11. Relays K1 and K2 are preferably individual normally open single pole relays but may be a single double pole normally open relay. Normally open relays K1 and K2 connect line 2 and neutral 3 respectively when the voltage of the supplied power is below approximately 132 Vrms and above approximately 60 Vrms and VSCC 11 routes power to relays K1 and K2. VSCC 11 may be of either analog or digital form. When VSCC 11 senses voltages in excess of the designed maximum or less than the designed minimum, VSCC 11 reroutes the electrical power from relays K1 and K2, thereby opening line 2 and neutral 3 and protecting any device connected to connector 5. VSCC 11 continues to monitor the input power voltage and will reconnect connector 5 by reclosing relays K1 and K2 when the out-of-tolerance voltage condition is no longer present and has remained so for approximately 10 to 20 seconds. In the exemplary embodiment, the disconnect time is approximately less than 100 milliseconds and is determined by the reaction time of relays K1 and K2. Additionally, the maximum disconnect/reconnect current is approximately 15 amperes, again depending on the performance capacity of relays K1 and K2. In the exemplary example, unit 10 is able to withstand continuous 300 Vrms between line 2-neutral 3, line 2-ground 4, or neutral 3-ground 4 without component damage.

Figure 2:
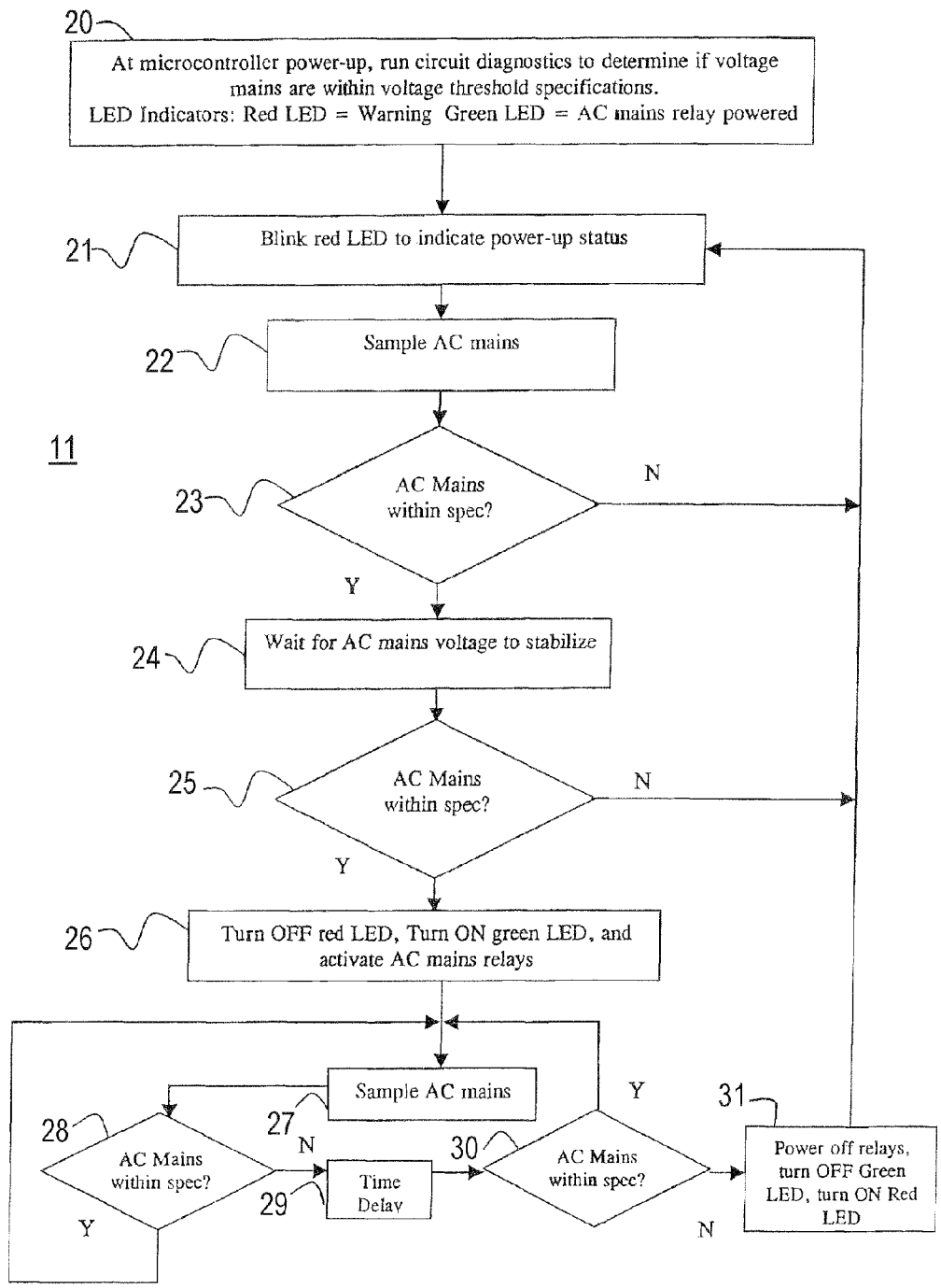
FIG. 2 is a logic diagram of a digital control circuit for an exemplary means to accomplish the method according to the present invention.

Referring to FIG. 2, a logic diagram of a digital VSCC 11 of exemplary apparatus 100 according to the present invention is shown. Block 20 "At microcontroller power-up, run circuit diagnostics to determine if voltage mains are within voltage threshold specifications. LED indicators: Red LED=Warning, Green LED=AC mains relay powered" represents determining the presence of at least minimum specification voltages immediately upon application of power to VSCC 11. Block 21 "Blink red LED to indicate power-up status" represents lighting of an light emitting diode to indicate power-up status. Block 22 "Sample AC mains" represents the first analog electrical sampling of the input power, line 2, neutral 3 and ground 4. Block 23 "AC mains within specification?" represents the initial determination of the power quality. If power is not within specification, the logic returns to Block 21; if it is within specification, the logic proceeds to Block 24 "Wait for AC mains voltage to stabilize". The stabilization period represented by Block 24 is determined by the microcontroller and is typically 100 to 200 ms. Block 25 "AC mains within specification?" represents a second determination of power quality, with out-of-specification power resulting in a return to Block 21 and within-specification power resulting in progression to Block 26. Block 26 "Turn off red LED, turn on green LED, and activate AC mains relays" represents the updating of the status LEDs and activation of relays K1 and K2. Block 27 "Sample AC mains, Block 28 "AC mains within specification?", Block 29 "Time delay" and Block 30 "AC mains within specification?" represent the continual monitoring of power quality, with Block 31 "Power-off relays, turn off green LED, turn on red LED" representing the action taken if the power quality strays out of specification for the time delay period, Block 29. Block 29 time delay is typically one cycle of the 60 hertz powerline wave form, or 16 ms.

Figure 3A:
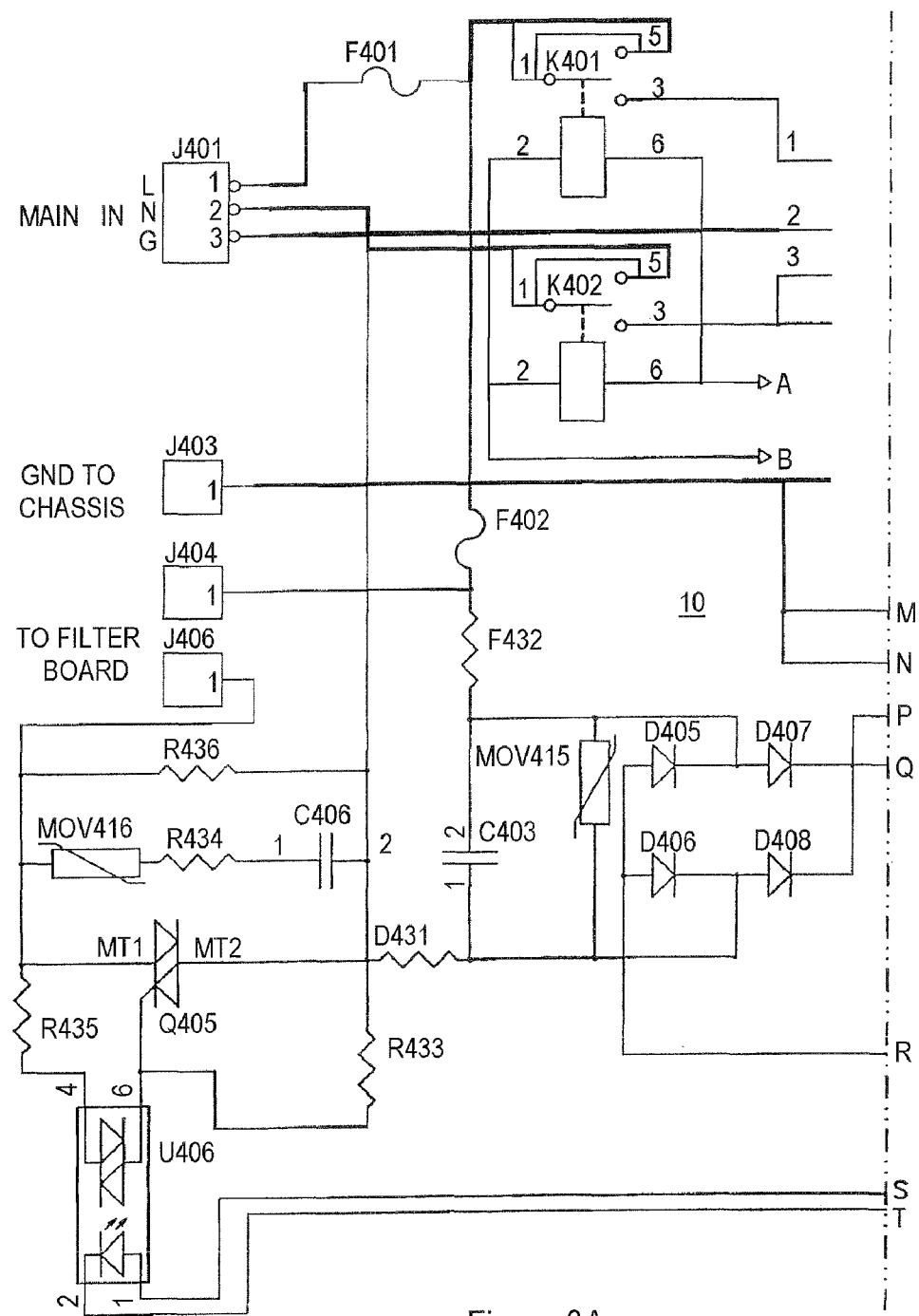
FIG. 3 is a schematic diagram of the exemplary analog means to accomplish the method of FIG. 1.
Figure 3B:
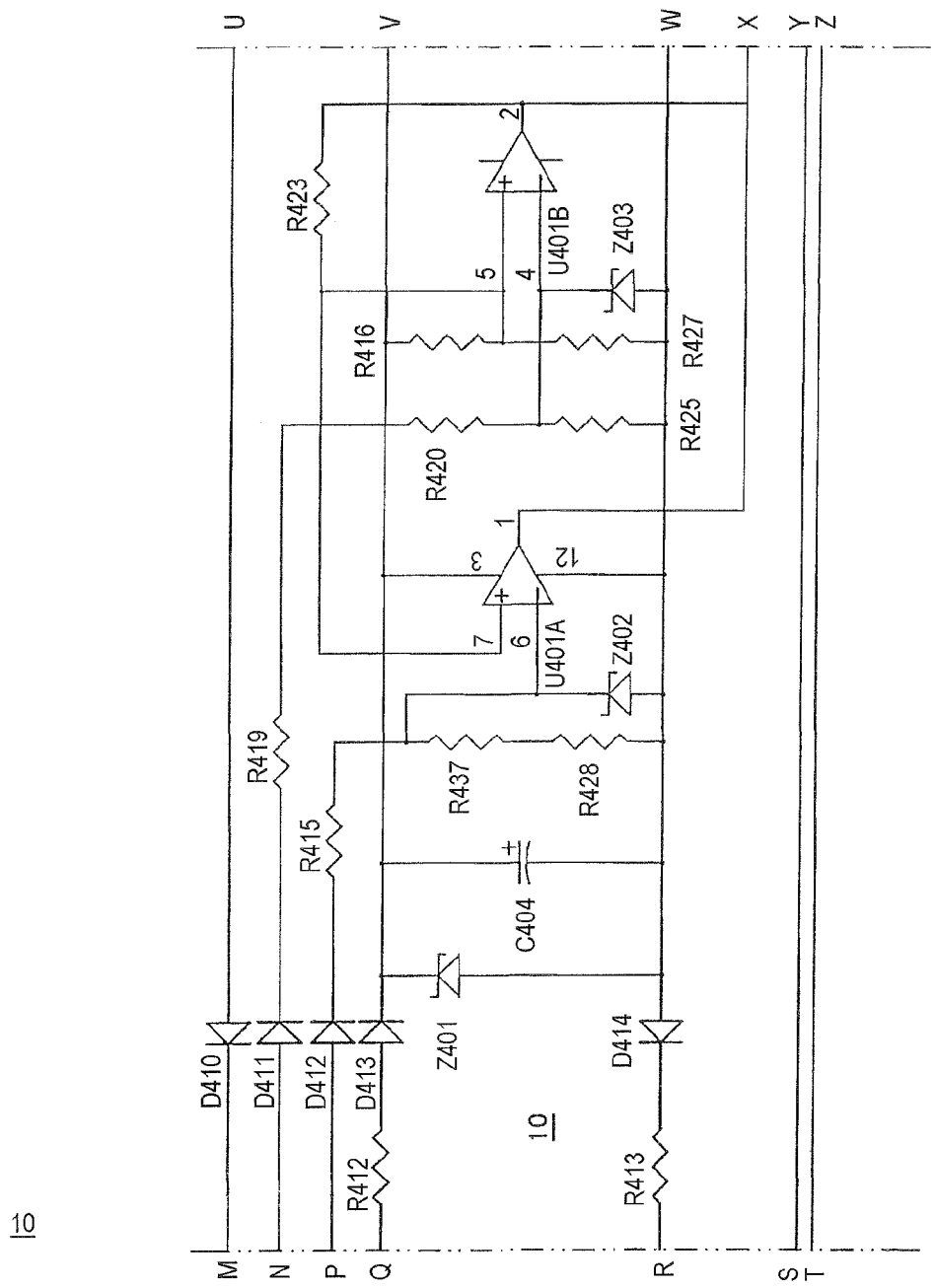
Figure 3C:
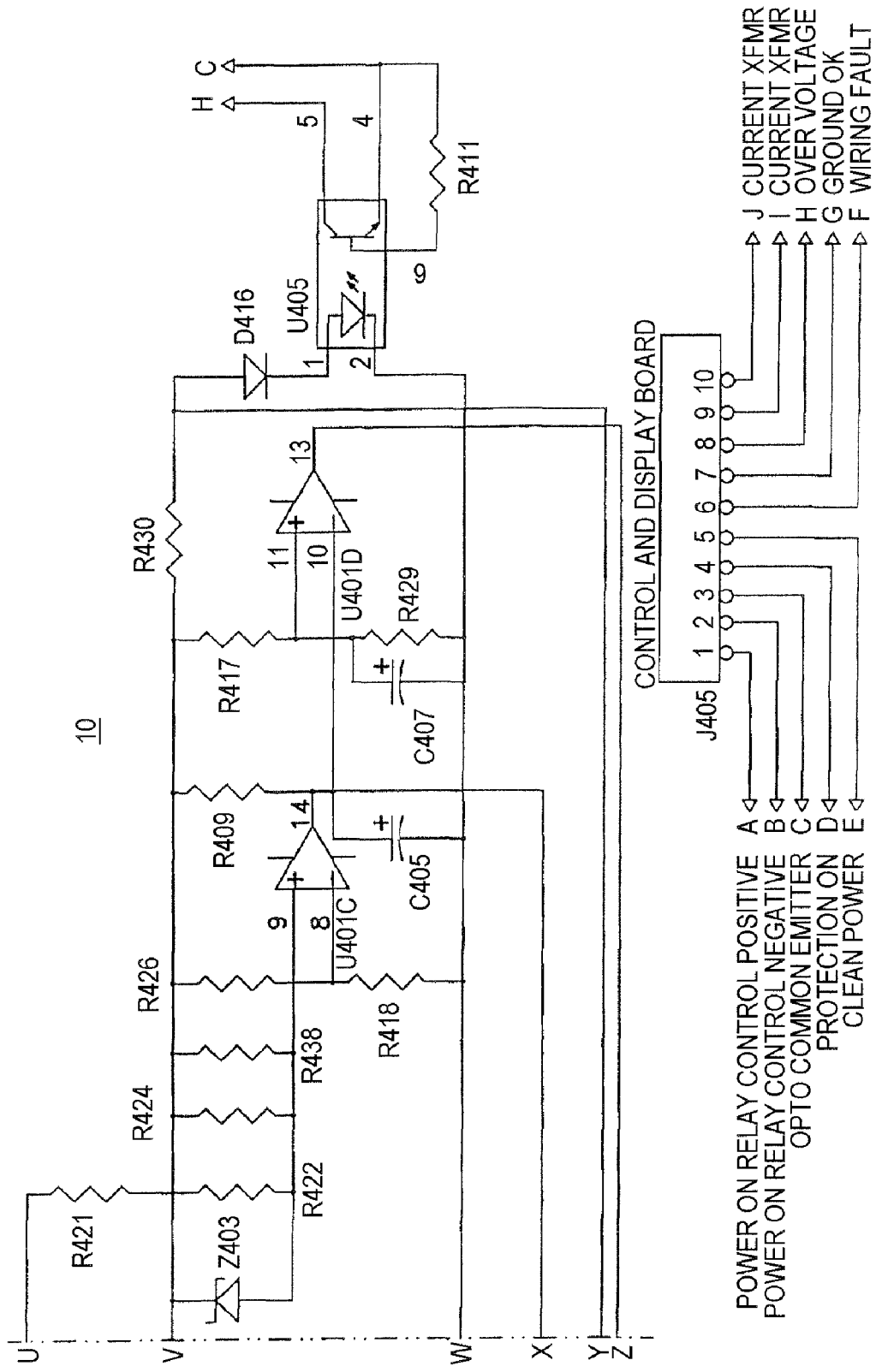
Figure 4:
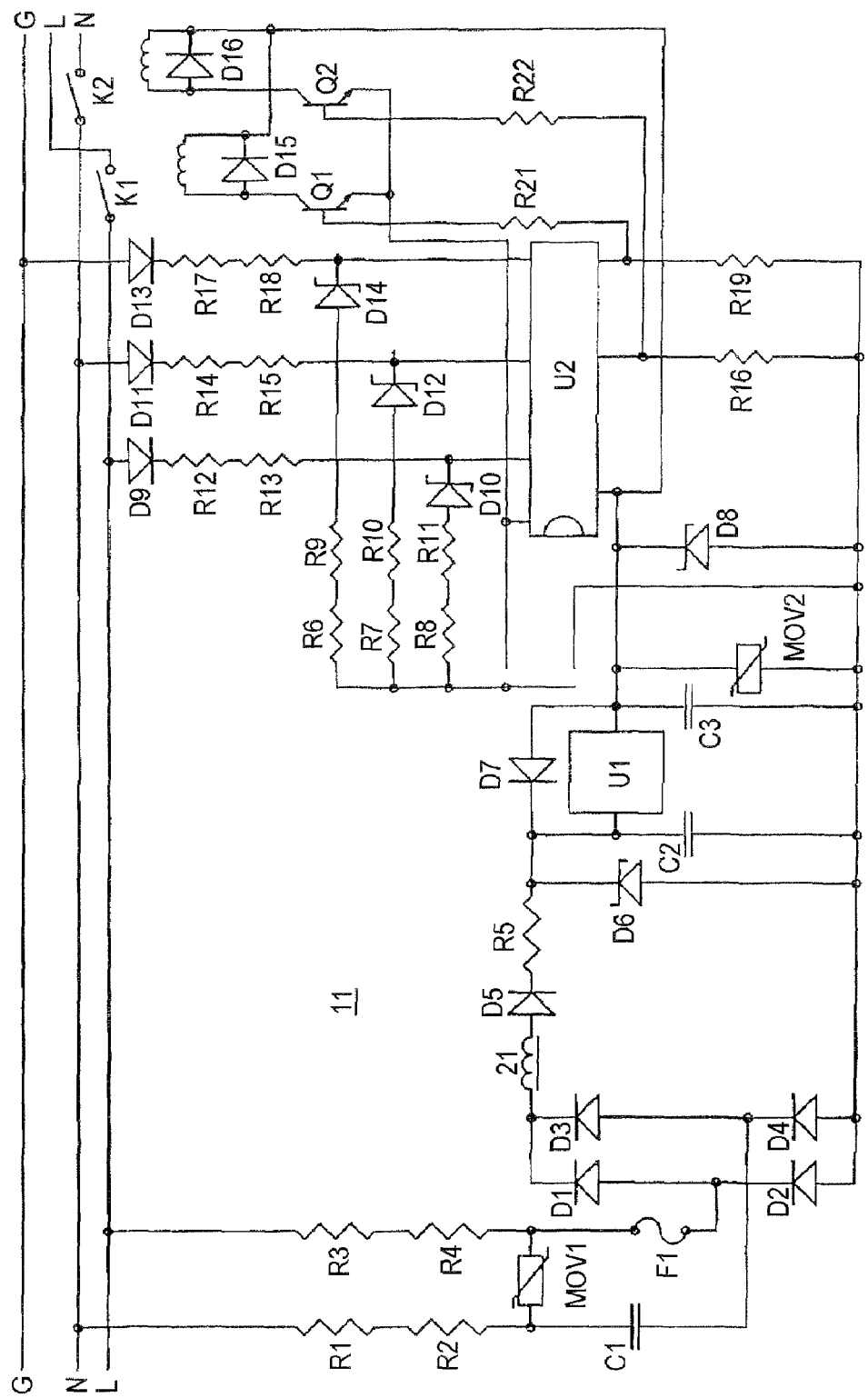
FIG. 4 is a schematic diagram of the exemplary digital means to accomplish the method of FIG. 1.

Referring now to FIGS. 3 and 4, schematic diagrams of the exemplary analog embodiment (FIG. 3) and digital embodiment (FIG. 4) circuit unit 100 are shown. Table 1 identifies the components of FIG. 3 and Table 2 identifies the components of FIG. 4.

TABLE 1

ANALOG EMBODIMENT COMPONENT LISTING

| REF | PART | REF | PART |
|---|---|---|---|
| C403 | 0.022 µF(250 V) | C404 | 220 µF (50 V) |
| C405 | 22 µF (25 V) | C406 | 0.0047 µF (1 KV) |
| C407 | 220 µF (50 V) | | |
| D405 | 1N4007 | D406 | 1N4007 |
| D407 | 1N4007 | D408 | 1N4007 |
| D410 | 1N4007 | D411 | 1N4007 |
| D412 | 1N4007 | D413 | 1N4007 |
| D414 | 1N4007 | D416 | 1N4148 |
| F401 | 20 A 250 V | F402 | 1 A 250 V |
| J401 | CON 1 | J403 | CON 1 |
| J404 | CON 1 | J405 | CON 1 |
| J406 | CON 1 | | |
| K401, K402 | 48 V coil, 30 A 250 V, 15 A 125 V contact, OMRON G8P-1114-US | | |
| MOV 415 | 275 V | MOV 416 | 275 V |
| R409 | 560 KΩ 1% | R411 | 560 KΩ |
| R412 | 1.5 KΩ 2 W | R413 | 1.5 K 2 W |
| R415 | 390 KΩ 1% | R416 | 120 KΩ 1% |
| R417 | 120 KΩ 1% | R418 | 120 KΩ 1% |
| R419 | 2 MΩ ½ W | R420 | 2 MΩ ½ W |
| R421 | 2 MΩ ½ W | R422 | 2 MΩ ½ W |
| R423 | 4 MΩ | R424 | 240 KΩ 1% |
| R425 | 180 KΩ 1% | R426 | 47.5 KΩ 1% |
| R427 | 4.7 KΩ 1% | R428 | 39 KΩ 1% |
| R429 | 240 KΩ 1% | R430 | 3.3 KΩ 1% |
| R431 | 4.7 KΩ 5 W | R432 | 4.7 KΩ 5 W |
| R433 | 33 KΩ ½ W | R434 | 33 KΩ 1 W |
| R435 | 1 KΩ ½ W | R436 | 22 KΩ 2 W |
| R437 | 15 KΩ 1% | R438 | 680 KΩ 1% |
| Q405 | MT136 600 V | | |
| U401A | LM339 | U401B | LM339 |
| U401C | LM339 | U401D | LM339 |
| U405 | 4N35 | U406 | MOC3080 |
| Z401 | 1N4744A | Z402 | 1N4744A |
| Z403 | 1N4744A | Z404 | 1N4744A |

TABLE 2

DIGITAL EMBODIMENT COMPONENT LIST

| REF. | PART | REF. | PART |
|---|---|---|---|
| C1 | 0.022 μF/250 V | C2 | 50 μF/50 V |
| C3 | 10 μF/25 V | | |
| D1 | 1N4007 | D2 | 1N4007 |
| D3 | 1N4007 | D4 | 1N4007 |
| D5 | 1N4007 | D6 | 15 V 1 W zener |
| D7 | 1N4007 | D8 | 5.1 V 1 W zener |
| D9 | 5.1 V 1 W zener | D10 | 5.1 V 1 W zener |
| D11 | 5.1 V 1 W zener | D12 | 5.1 V 1 W zener |
| D13 | 5.1 V 1 W zener | D14 | 5.1 V 1 W zener |
| D15 | 1N4007 | D16 | 1N4007 |
| F1 | 1 A 250 V | | |
| K1, K2 | 48 V coil 30 A 250 V, 15 A 125 V contacts, OMRON G8P-1114P-UA | | |
| L1 | 56 μH 1.48 A | | |
| MOV1 | 275 V | MOV2 | 275 V |
| Q1 | 4401 NPN | Q2 | 4401 NPN |
| R1 | 2.2 KΩ 1 W | R2 | 2.2 KΩ 1 W |
| R3 | 2.2 KΩ 1 W | R4 | 2.2 KΩ 1 W |
| R5 | 1.5 KΩ 1 W | R6 | 1.5 KΩ 1 W |
| R7 | 1.3 MΩ ½ W | R8 | 1.3 MΩ ½ W |
| R9 | 1.3 MΩ ½ W | R10 | 1.3 MΩ ½ W |
| R11 | 1.3 MΩ ½ W | R12 | 1.3 MΩ ½ W |
| R13 | 20 KΩ ½ W | R14 | 20 KΩ ½ W |
| R15 | 20 KΩ ½ W | R16 | 20 KΩ ½ W |
| R17 | 10 KΩ | R18 | 20 KΩ ½ W |
| R19 | 20 KΩ ½ W | R20 | 4.7 KΩ |
| R21 | 4.7 KΩ | | |
| U1 | 7805 + 5 V regulator | U2 | PIC1212CE674 |

In the exemplary embodiment, relays K1 and K2 are normally open when not energized. Under normal voltage conditions these relays will be energized, allowing line 2 and neutral 3 to conduct from input connector 1 to output connector 5. Full wave bridge rectifier diodes D8, D9, D10 and D12 rectify a portion of the received AC power to non-filtered full-wave waveform to be monitored by comparators U1A and U2A for over voltage. The voltage is routed, reduced, filtered and regulated to 15 Vdc by Zener diodes D7 and D17 and R10, C2 and C4 to power the comparators. The comparator U2A monitors L-N and positive G-L, N voltage. R11 and R20 on U2A set the reference voltage with respect to pin 4 of U2A. When L-N or positive G-L, N instantaneous voltage exceeds 132 Vrms, scaled down voltage at U2A pin 2 will be higher than pin 3. The transistor in U2A at pin 1 will conduct and discharge capacitor C5, making pin 7 of U2B go low. When the voltage at pin 7 of U2B goes low, the current through R14 that is normally used to turn on the relays is routed instead to U2B. The relays K1 and K2 will be de-energized and disconnect the line and neutral circuits instantaneously. When line voltage returns to normal, the R12 and C15 combination delays the relays' reconnect time by 15 seconds.

The comparator U1A does the same thing as U2A but on negative G-L, N over voltage. Opto-isolator U3 sends this over voltage signal to U2B. Transistors Q1 and 43 cut off voltage to filter capacitor C3 during the over voltage condition. This will prevent relays K1 and K2 coil breakdown from voltage stored in the capacitor during high voltage conditions, when reconnecting the line.

In the digital embodiment, the functions of control circuit 11 are performed by a microprocessor instead of the analog components described above. Microprocessor logic is shown in FIG. 2 and an exemplary schematic is shown in FIG. 4. The components are listed in Table 2. A preferred microcontroller having EEPROM capability is available from Microchip, as model PIC12C672 or model PIC12C674. The preferred microcontroller has at least three analog-to-digital (ADC) input pins for sensing all the voltage mains (Line, Neutral, Ground). The microcontroller is a 4 MHz, or greater, processor which will sample all three mains in 1 ms or less. It takes multiple samples, at least 10 times or more, of the mains' voltage, scaled down using high tolerance resistors, for appropriate sample averaging. Other, similar, microcontrollers are also available and may be substituted as long as they have the appropriate characteristics.

The analog and digital apparatuses protect for three mis-wiring scenarios. The exemplary apparatus functions to detect and protect against three common mis-wiring scenarios in which the input power varies from that normally expected, i.e., the normal is where the line 2 is +120 Vac, the neutral 3 is 0 Vac and the ground is properly connected to an earthen ground. Mis-wiring scenario A has line 2 connected to +120 Vac, neutral 3 connected to neutral, and ground 4 connected to −120 Vac. Scenario B has line 2 connected to neutral, neutral 3 connected to −120 Vac, and ground 4 connected to +120 Vac. Scenario C has line 2 connected to −120 Vac, neutral 3 connected to +120 Vac, and ground 4 connected to neutral.

Information as herein shown and described in detail is fully capable of attaining the above-described object of the invention, the presently preferred embodiments of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more". All structural, electrical, and functional equivalents to the elements of the above-described preferred embodiment and additional embodiments that are known to those of ordinary skill in the art are expressly incorporated herein by reference and are intended to be encompassed by the present claims.

Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

INDUSTRIAL APPLICABILITY

The present invention may be used to protect electrically powered devices such as audio, visual and digital apparatuses and the like from dangerous electrical power surges, low and high voltages and other transient forces that may be imposed on electrical power sources, for example by lightning strikes or "brown-out" power conditions. The invention may be used by technicians familiar with electrical and digital components available in the market place. The method enables detection of an out-of-tolerance condition and disconnects a load from a power source, then reconnects the load when the power source has been stable and within tolerance for a set period of time.

What is claimed is:
1. A method of providing electrical over/under voltage protection comprising:

a. providing a connecting means for connecting to a supply of at least one phase of alternating current power having a line, neutral and ground;
b. providing a sensing means for sensing the voltage of the supplied power, wherein the sensing means detects voltage differences between the following lines:
   i. line and neutral;
   ii. line and ground; or
   iii. neutral and ground;
c. determining whether the voltage is within an acceptable voltage range across at least 2 of the preceding lines;
d. providing a power surge absorption means;
e. providing a distribution means having a corresponding line, neutral and ground for distributing the sensed power;
f. providing a disconnecting means for disconnecting the distribution means line and neutral from the power source when the sensing means detects an out-of-tolerance voltage condition across the line-neutral, or line-ground, wherein the sensing means activates the disconnecting means before the apparatus suffers electrical damage;
g. a reconnecting means for reconnecting the sensed power to the distribution means when the sensing means no longer detects an out-of-tolerance voltage condition; and
h. wherein detection of the out-of-tolerance voltage condition comprises detection of a voltage of less than approximately 60 Vrms and greater than approximately 132 Vrms.

2. The method in accordance with claim 1 wherein providing a sensing means comprises selecting a sensing means selected from a group comprising analog devices and digital devices.

3. The method in accordance with claim 2 wherein the sensing means detects voltages in excess of 132 Vrms.

4. The method in accordance with claim 1 wherein the distribution means distributes power through at least one three-prong electrical outlet receptacle.

5. The method of claim 1 wherein the reconnecting means activates after a delay of approximately 15 seconds from when the sensing means no longer detects an out-of-tolerance voltage condition.

* * * * *